(12) United States Patent
Kamohara

(10) Patent No.: US 8,148,462 B2
(45) Date of Patent: Apr. 3, 2012

(54) AQUEOUS POLYURETHANE FLUID DISPERSION AND METHOD FOR PRODUCING THE SAME

(75) Inventor: Takao Kamohara, Shunan (JP)

(73) Assignee: Tosoh Corporation, Shunan-Shi (JP)

( * ) Notice: Subject to any disclaimer, the term of this patent is extended or adjusted under 35 U.S.C. 154(b) by 469 days.

(21) Appl. No.: 12/307,324

(22) PCT Filed: Jul. 6, 2007

(86) PCT No.: PCT/JP2007/063555
§ 371 (c)(1),
(2), (4) Date: Jan. 2, 2009

(87) PCT Pub. No.: WO2008/004658
PCT Pub. Date: Jan. 10, 2008

(65) Prior Publication Data
US 2009/0312488 A1 Dec. 17, 2009

(30) Foreign Application Priority Data

Jul. 7, 2006 (JP) ................ P2006-188686

(51) Int. Cl.
*C08G 18/08* (2006.01)
*C08G 18/28* (2006.01)
*C08J 3/00* (2006.01)
*C08K 3/20* (2006.01)
*C08L 75/00* (2006.01)

(52) U.S. Cl. ........ 524/591; 524/589; 524/590; 524/839; 524/840

(58) Field of Classification Search ........... 524/589, 524/590, 591, 839, 840
See application file for complete search history.

(56) References Cited

U.S. PATENT DOCUMENTS

| 2002/0077413 A1 | 6/2002 | Kitada et al. |
| 2003/0232199 A1 | 12/2003 | Rische et al. |
| 2006/0216525 A1 * | 9/2006 | Huybrechts et al. ....... 428/423.1 |

FOREIGN PATENT DOCUMENTS

| CA | 928323 | 6/1973 |
| JP | 7-228660 A | 8/1995 |
| JP | 10-110021 A | 4/1998 |
| JP | 2002-201254 A | 7/2002 |
| JP | 2004-203972 A | 7/2004 |
| JP | 2004-250316 A | 9/2004 |
| JP | 2005-187570 A | 7/2005 |

* cited by examiner

*Primary Examiner* — Patrick Niland
(74) *Attorney, Agent, or Firm* — Birch, Stewart, Kolasch & Birch, LLP

(57) ABSTRACT

Disclosed is an aqueous polyurethane obtained by reacting a sulfonate containing a hydrophilic group represented by the following general formula (1):

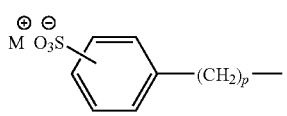

(1)

(in which M represents an alkali metal atom or an ammonium, and p represents an integer of 2 to 20) and an amino group with a polyurethane prepolymer having an isocyanate group at an end thereof, characterized in that the hydrophilic group represented by the general formula (1) bonds with a urea bond moiety of the polyurethane.

15 Claims, No Drawings

AQUEOUS POLYURETHANE FLUID DISPERSION AND METHOD FOR PRODUCING THE SAME

TECHNICAL FIELD

The present invention relates to an aqueous polyurethane having a novel hydrophilic group structure, an aqueous polyurethane fluid dispersion having the same, and a method for producing the same.

Priority is claimed on Japanese Patent Application No. 2006-188686, filed Jul. 7, 2006, the content of which is incorporated herein by reference.

BACKGROUND ART

A self-emulsification-type aqueous polyurethane internally having a hydrophilic group is broadly applied to paints, adhesives, or fluid dispersions used for treating fibers.

As such an aqueous polyurethane having a hydrophilic group, aqueous polyurethanes having a carboxylate derived from dimethylol propionic acid (DMPA), dimethylol butanoic acid (DMBA), or the like, are known. However, the aqueous polyurethane having a carboxylate lacks in: storage stability due to its readily hydrolyzable properties; stability against pH; and thermal resistance of coating film. In addition, carboxylate is inferior to sulfonate in terms of hydrophilicity, and therefore the carboxylate is required to be introduced in the polyurethane at a high concentration so as to obtain a stable polyurethane fluid dispersion.

On the other hand, sulfonate is conventionally introduced by reacting N-(2-aminoethyl)-2-aminoethane sulfonate (AAS salt) (see, for example, Patent Document 1) with a prepolymer having an isocyanate at an end thereof, or by introducing sulfosodium isophthalate into polyol to obtain polyurethane (see, for example, Patent Document 2). Since the sulfonate-based polyurethane has a higher hydrophilicity than the carboxylate-based polyurethane, it is considered that the content of hydrophilic group in the sulfonate-based polyurethane can be decreased and deterioration of hydrolysis resistance or thermal resistance can be suppressed. Accordingly, the sulfonate-based aqueous polyurethane is preferably applied to adhesives, in particular.

However, the structure of the conventionally known hydrophilic group destabilizes the dispersion if the conventionally known hydrophilic group is at a certain concentration or less, and therefore there is a limitation on the improvement of the properties by decreasing the concentration of hydrophilic group, although the concentration of hydrophilic group in polyurethane is required to be low so as to further improve properties.

[Patent Document 1] Canadian Patent No. 928323, Description

[Patent Document 2] Japanese Unexamined Patent Application, First Publication No. H10-110021.

DISCLOSURE OF THE INVENTION

Problems to be Solved by the Invention

The present invention has been achieved in view of the above-mentioned problems and an object thereof is to provide an aqueous polyurethane having a sufficient hydrophilicity and an excellent dispersion stability even if the content of a hydrophilic group chemically bonding in the polyurethane is small.

Means for Solving the Problems

As a result of intensive study in order to solve the above-mentioned problems, the inventors of the present invention have found that an aqueous polyurethane containing a hydrophilic group having a particular sulfonate structure produces a stable aqueous polyurethane fluid dispersion having a small particle size even if the amount of hydrophilic group introduced is small, and the present invention has been completed.

That is, the present invention relates to an aqueous polyurethane, an aqueous polyurethane fluid dispersion, and a method for producing the same, as shown below.

[1] An aqueous polyurethane obtained by reacting a sulfonate having a hydrophilic group represented by the general formula (1) shown below and an amino group with a polyurethane prepolymer having an isocyanate group at an end thereof, characterized in that the hydrophilic group represented by the general formula (1) bonds with a urea bond moiety of the polyurethane.

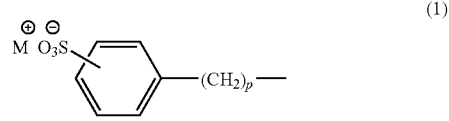

(In the general formula (1), M represents an alkali metal atom or an ammonium, and p represents an integer of 2 to 20.)

[2] The aqueous polyurethane according to the above-mentioned [1], characterized in that the sulfonate having the hydrophilic group represented by the general formula (1) and the amino group is a sulfonate-containing amino compound represented by the general formula (2) shown below.

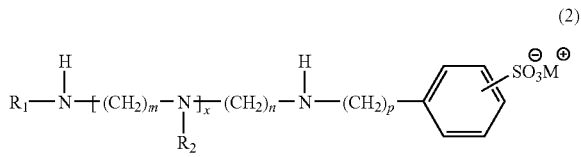

(In the general formula (2), $R_1$, represents a hydrogen atom or the group represented by the general formula (1), $R_2$ represents a hydrogen atom, an alkyl group having 1 to 4 carbon atoms, or the group represented by the general formula (1), M represents an alkali metal atom or an ammonium, m and n each independently represents an integer of 1 to 20, p represents an integer of 2 to 20, and x represents an integer of 0 to 3.)

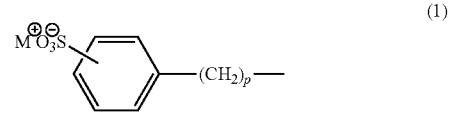

(In the general formula (1), M represents an alkali metal atom or an ammonium and p represents an integer of 2 to 20.)

[3] The aqueous polyurethane obtained by reacting a sulfonate having a hydrophilic group represented by the general formula (3) shown below and an amino group with a polyurethane prepolymer having an isocyanate group at an end thereof, characterized in that the hydrophilic group represented by the general formula (3) bonds with a urea bond moiety of the polyurethane.

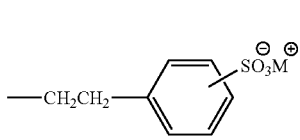
(3)

(In the general formula (3), M represents an alkali metal atom or an ammonium.)

[4] The aqueous polyurethane according to the above-mentioned [3], characterized in that the sulfonate having the hydrophilic group represented by the general formula (3) and the amino group is a sulfonate-containing amino compound represented by the general formula (4) shown below.

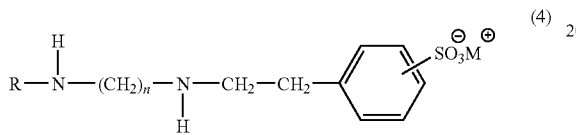
(4)

(In the general formula (4), R represents a hydrogen atom, an alkyl group having 1 to 4 carbon atoms, or a group represented by the general formula (3), M represents an alkali metal atom or an ammonium, and n represents an integer of 1 to 20).

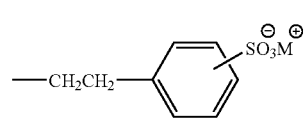
(3)

(In the general formula (3), M represents an alkali metal atom or an ammonium.)

[5] The aqueous polyurethane according to any one of the above-mentioned [1] to [4], characterized in that the polyurethane prepolymer having the isocyanate group at an end thereof is a polyurethane prepolymer obtained by reacting a polyol ingredient and a diisocyanate ingredient.

[6] A method for producing the aqueous polyurethane of the above-mentioned [1] or [2], characterized in that a sulfonate having a hydrophilic group represented by the general formula (1) shown below and an amino group is reacted with a polyurethane prepolymer having an isocyanate group at an end thereof.

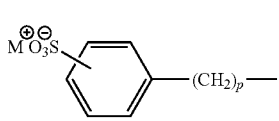
(1)

(In the general formula (1), M represents an alkali metal atom or an ammonium, and p represents an integer of 2 to 20.)

[7] The method for producing the aqueous polyurethane according to the above-mentioned [6], characterized in that the sulfonate having the hydrophilic group represented by the general formula (1) and the amino group is a sulfonate-containing amino compound represented by the general formula (2) shown below.

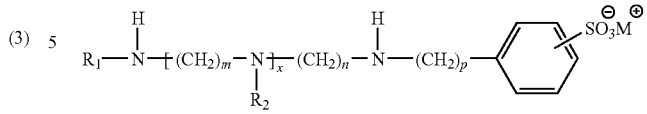
(2)

(In the general formula (2), $R_1$ represents a hydrogen atom or the group represented by the general formula (1), $R_2$ represents a hydrogen atom, an alkyl group having 1 to 4 carbon atoms, or the group represented by the general formula (1), M represents an alkali metal atom or an ammonium, m and n each independently represents an integer of 1 to 20, p represents an integer of 2 to 20, and x represents an integer of 0 to 3.)

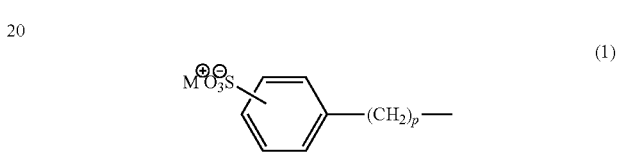
(1)

(In the general formula (1), M represents an alkali metal atom or an ammonium, and p represents an integer of 2 to 20.)

[8] A method for producing the aqueous polyurethane of the above-mentioned [3] or [4], characterized in that a sulfonate having a hydrophilic group represented by the general formula (3) shown below and an amino group with a polyurethane prepolymer having an isocyanate group at an end thereof.

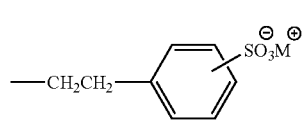
(3)

(In the general formula (3), M represents an alkali metal atom or an ammonium.)

[9] The method for producing the aqueous polyurethane according to the above-mentioned [8], characterized in that the sulfonate having the hydrophilic group represented by the general formula (3) and the amino group is a sulfonate-containing amino compound represented by the general formula (4) shown below.

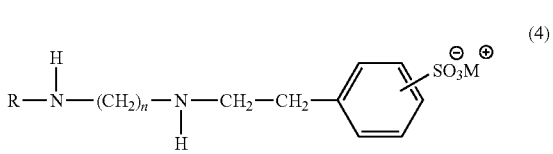
(4)

(In the general formula (4), R represents a hydrogen atom, an alkyl group having 1 to 4 carbon atoms, or the group represented by the general formula (3), M represents an alkali metal atom or an ammonium, and n represents an integer of 1 to 20).

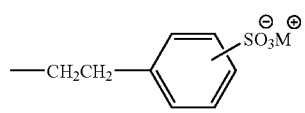 (3)

(In the general formula (3), M represents an alkali metal atom or an ammonium.)

[10] The method for producing the aqueous polyurethane according to any one of the above-mentioned [6] to [9], characterized in that the polyurethane prepolymer having an isocyanate group at an end thereof is a polyurethane prepolymer obtained by reacting a polyol ingredient and a diisocyanate ingredient.

[11] An aqueous polyurethane fluid dispersion containing the aqueous polyurethane of any one of the above-identified [1] to [5].

[12] A method for producing the aqueous polyurethane fluid dispersion of the above-mentioned [11], characterized in that a sulfonate having a hydrophilic group represented by the general formula (1) shown below or the general formula (3) shown below and an amino group is reacted with a polyurethane prepolymer having an isocyanate group at an end thereof to obtain a reactant liquid, water is added to the reactant liquid, and an aqueous polyurethane is emulsified and dispersed.

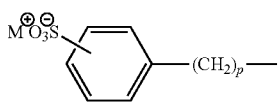 (1)

(In the general formula (1), M represents an alkali metal atom or an ammonium, and p represents an integer of 2 to 20.)

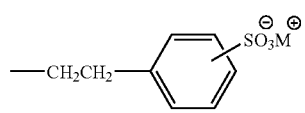 (3)

(In the general formula (3), M represents an alkali metal atom or an ammonium.)

[13] The method for producing the aqueous polyurethane fluid dispersion according to the above-mentioned [12], characterized in that the sulfonate having the hydrophilic group represented by the general formula (1) and the amino group is a sulfonate-containing amino compound represented by the general formula (2) shown below.

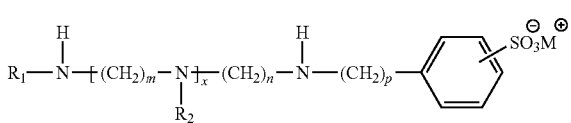 (2)

(In the general formula (2), $R_1$ represents a hydrogen atom or the group represented by the general formula (1), $R_2$ represents a hydrogen atom, an alkyl group having 1 to 4 carbon atoms, or the group represented by the general formula (1), M represents an alkali metal atom or an ammonium, m and n each independently represents an integer of 1 to 20, p represents an integer of 2 to 20, and x represents an integer of 0 to 3).

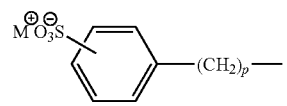 (1)

(In the general formula (1), M represents an alkali metal atom or an ammonium, and p represents an integer of 2 to 20.)

[14] The method for producing the aqueous polyurethane fluid dispersion according to the above-mentioned [12], characterized in that the sulfonate having the hydrophilic group represented by the general formula (3) and the amino group is a sulfonate-containing amino compound represented by the general formula (4) shown below.

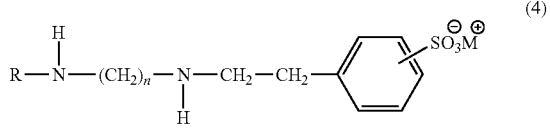 (4)

(In the general formula (4), R represents a hydrogen atom, an alkyl group having 1 to 4 carbon atoms, or the group represented by the general formula (3), M represents an alkali metal atom or an ammonium, and n represents an integer of 1 to 20).

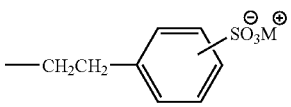 (3)

(In the general formula (3), M represents an alkali metal atom or an ammonium.)

[15] The method for producing the aqueous polyurethane fluid dispersion according to any one of the above-mentioned [12] to [14], characterized in that the polyurethane prepolymer having the isocyanate group at an end thereof is a polyurethane prepolymer obtained by reacting a polyol ingredient and a diisocyanate ingredient.

Effects of the Invention

Since the aqueous polyurethane according to the present invention can provide a stable aqueous polyurethane fluid dispersion having a small particle size even if the concentration of hydrophilic group is low, the aqueous polyurethane is industrially extremely useful.

BEST MODE FOR CARRYING OUT THE INVENTION

In the following, the present invention will be explained in detail.

An aqueous polyurethane according to the present invention is an aqueous polyurethane obtained by reacting a sulfonate having a hydrophilic group represented by the general formula (1) and an amino group with a polyurethane prepolymer having an isocyanate group at an end thereof, characterized in that the hydrophilic group represented by the general formula (1), preferably the hydrophilic group represented by the general formula (3), bonds with a urea bond moiety of the polyurethane.

The sulfonate having the hydrophilic group represented by the general formula (1) or the general formula (3) and an amino group, to be used as a hydrophilizing agent, is not particularly limited. However, there may be a case in which the hydrophilic group exists only at an end of the polymer chain, a sufficient hydrophilizability is not exhibited, the prepolymer coupling does not sufficiently proceed, and therefore no polymeric polyurethane is obtained, if the number of the amino group is one. Accordingly, a sulfonate having at least two amino groups and the hydrophilic group represented by the general formula (1) or the general formula (3) in a molecule thereof so that the hydrophilic group is introduced in the center at which the polyurethane prepolymers are linked together is preferable, and an amino group-containing sulfonate represented by the general formula (2) or the general formula (4) is more preferable in the practice of the present invention.

In the general formula (2), $R_1$ represents a hydrogen atom or the group represented by the general formula (1). $R_2$ represents a hydrogen atom, an alkyl group having 1 to 4 carbon atoms, or the group represented by the general formula (2). M represents an alkali metal atom or an ammonium. m and n each independently represents an integer of 1 to 20, preferably an integer of 1 to 8. p represents an integer of 2 to 20, preferably an integer of 2 to 8. x represents an integer of 0 to 3, preferably 0 or 1. In the general formula (1), M represents an alkali metal atom or an ammonium. p represents an integer of 2 to 20, preferably an integer of 2 to 8.

In the general formula (4), R represents a hydrogen atom or the group represented by the general formula (3), M represents an alkali metal atom or an ammonium, and n represents an integer of 1 to 8. In the general formula general formula (3), M represents an alkali metal atom or an ammonium.

Although the alkali metal atom as M is not particularly limited according to the present invention, examples thereof include lithium, sodium, potassium, and the like. Although the ammonium as M is not particularly limited, examples thereof include ammoniums derived from ammonia, methylamine, dimethylamine, ethylamine, diethylamine, triethylamine, isopropylamine, ethanolamine, methylethanolamine, ethylethanolamine, diethanolamine, triethanolamine, or the like.

m and n in the general formula (2) and n in the general formula (4) each independently represents an integer of 1 to 20, preferably an integer of 1 to 8, and examples of corresponding alkylene groups include a methylene group, an ethylene group, a propylene group, a tetramethylene group, a pentamethylene group, a hexamethylene group, and the like. p in the general formulae (1) and (2) represents an integer of 2 to 20, preferably an integer of 2 to 8, and examples of corresponding alkylene groups include an ethylene group, a propylene group, a tetramethylene group, a pentamethylene group, a hexamethylene group, and the like.

Although the sulfonate having the amino groups represented by the general formula (2) may be produced in accordance with various known methods without particular limitations, the sulfonate may be produced easily in a reaction manner represented by the following general formula (5).

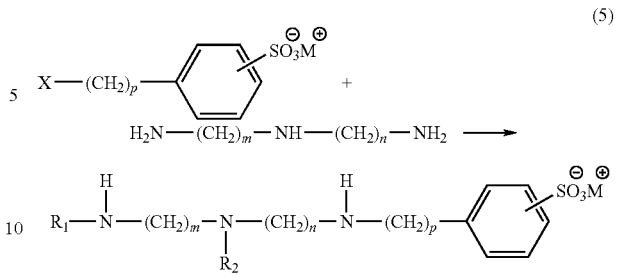

(In the general formula (5), $R_1$, represents a hydrogen atom or a group represented by the general formula (2), $R_2$ represents a hydrogen atom, or an alkyl group having 1 to 4 carbon atoms, M represents an alkali metal atom or an ammonium, m and n each independently represents an integer of 1 to 20, and p represents an integer of 2 to 20, and X represents a halogen atom.)

According to the present invention, the polyurethane prepolymer having an isocyanate group at an end thereof may be produced easily by reacting a polyol ingredient and a diisocyanate ingredient.

The polyol ingredient is not particularly limited according to the present invention, and any polyol ingredients available for producing conventional polyurethane may be suitably adopted. Examples of the polyol ingredient include polyesterpolyols obtained by an esterification reaction of a glycol ingredient, such as ethylene glycol, propylene glycol, 1,3-propanediol, 1,4-butanediol, 1,5-pentanediol, 3-methyl-1,5-pentanediol, 1,6-hexanediol, neopentyl glycol, butylethylpropanediol, diethylene glycol, triethylene glycol, tetraethylene glycol, polyethylene glycol, dipropylene glycol, tripropylene glycol, or the like, with a dicarboxylic acid ingredient, such as succinic acid, adipic acid, azelaic acid, sebacic acid, dodecanedicarboxylic acid, maleic acid anhydride, fumaric acid, 1,3-cyclopentanedicarboxylic acid, 1,4-cyclohexanedicarboxylic acid, terephthalic acid, isophthalic acid, phthalic acid, naphthalenedicarboxylic acid, or the like; polyether polyols obtained by performing addition polymerization in the usual manner using at least one of monomers such as ethylene oxide, propylene oxide, butylene oxide, styrene oxide, epichlorohydrin, tetrahydrofuran, cyclohexylene, or the like, together with at least one compound having at least two active hydrogen atoms, such as ethylene glycol, diethylene glycol, triethylene glycol, propylene glycol, trimethylene glycol, 1,3-butanediol, 1,4-butanediol, 1,6-hexanediol, neopentyl glycol, glycerin, trimethylolethane, or trimethylolpropane, as an initiator; polycarbonate polyols; polycaptolactone polyols; polybutadiene polyols, and the like. The molecular weight of such a polyol is not particularly limited, and a polyol with a molecular weight of 62 to 10000 is generally used.

The diisocyanate ingredient is not particularly limited, and any diisocyanate ingredients available for producing polyurethane in the usual manner may be suitably adopted. Specific examples thereof include 1,6-hexamethylene diisocyanate, tetramethylene diisocyanate, 1,3-cyclohexylene diisocyanate, 1,4-cyclohexylene diisocyanate, isophorone diisocyanate, 4,4'-dicyclohexylmethane diisocyanate, 2,4-tolylenediisocyanate, 2,6-tolylenediisocyanate, m-phenylenediisocyanate, p-phenylenediisocyanate, 4,4'-diphenylmethane diisocyanate, 2,4-diphenylmethane diisocyanate, 2,2'-diphenylmethane diisocyanate, 1,5-naphthalene diisocyanate, 1,5-tetrahydronaphthalene diisocyanate, and the like. Among the diisocyanate ingredients, aliphatic or alicyclic isocyanates having a low reactivity to water, to which a hydrophilizing agent can be easily introduced, may be preferably used.

When the polyol ingredient and the diisocyanate ingredient are reacted to synthesize a polyurethane prepolymer according to the present invention, it is required that the diisocyanate ingredient having a greater amount of isocyanate than the hydroxyl value (OH value) of the polyol ingredient be used for reaction so that an isocyanate group remains at an end, in view of the necessity for forming a urea bond in the subsequent reaction with a hydrophilizing agent containing the hydrophilic group represented the general formula (1) and the amino group. The remaining content of isocyanate is indicated by an isocyanate value (% by weight of NCO with respect to 1 g of the prepolymer) and the isocyanate value is preferably within the range of 0.05% to 10%. If the isocyanate value is less than 0.05%, the amount of the hydrophilizing agent to be introduced is limited, and there is a possibility in which sufficient hydrophilicity is not provided. If the isocyante value exceeds 10%, the molecular weight of the prepolymer decreases, which may affect the physical properties.

If the thus obtained polyurethane prepolymer having an isocyanate group at an end thereof and the sulfonate having the hydrophilic group represented by the general formula (1) and the amino group (hydrophilizing agent) are reacted (as well as a chain extender if needed), the isocyanate group in the polyurethane prepolymer and the amino group in the sulfonate are reacted to form a urea bond. Thus, an aqueous polyurethane in which the hydrophilic group represented by the general formula (1) is bonded with a urea bond moiety is obtained.

It is preferable that the reaction of the polyurethane prepolymer and the hydrophilizing agent (as well as the chain extender if needed) be performed by dissolving the polyurethane prepolymer in a solvent inactive to the isocyanate group, such as dioxane, acetone, methylethyl ketone, acetonitrile, ethyl acetate, tetrahydrofuran, or the like, followed by adding the hydrophilizing agent and then reacting the mixture at 30° C. to 120° C. for 0.1 to 10 hours so as to proceed with the reaction homogeneously.

It is preferable that the amount of the hydrophilizing agent to be added be within the range of 0.01 mmol/g to 0.5 mmol/g as a hydrophilic group equivalent so as to obtain a stable aqueous polyurethane fluid dispersion. If the hydrophilic group equivalent is less than 0.01 mmol/g, the dispersion stability of the aqueous polyurethane formed later tends not to be sufficient, and the phase separation tends to readily proceed. If the hydrophilic group quivalent exceeds 0.5 mmol/g, introduction of an excess amount of hydrophilic group promotes entanglement among polyurethanes in water, and therefore gelation proceeds and defects such as suppression of particle dispersion tend to readily occur.

It is important that the hydrophilic group has a benzene ring in its structure as shown in the general formula (1). If a hydrophilizing agent in which a hydrophilic group does not have any benzene rings is used, 0.1 to 1.0 mmol/g, high concentration, of hydrophilic group equivalent is required to obtain a stable aqueous polyurethane fluid dispersion, and the particle size of polyurethane tends to coarsen, even if the hydrophilic group equivalent is not changed.

According to the present invention, the same chain extender as that conventionally used for producing polyurethane may be used, as needed. Examples thereof include polyamines, such as, ethylenediamine, hexamethylenediamine, isophoronediamine, 2,4-diaminotoluene, 4,4'-diaminodiphenylmethane, N,N'-dimethylethylenediamine, 4,4'-diamino cyclohexylmethane, piperazine, 2,5-dimethylpiperazine, 1,4-diaminocyclohexane, 1,2-diaminopropane, hydrazine, and the like, and amino alcohols, such as, ethanolamine, N-methyldiethanolamine, propanolamine, N-methyldiisopropanolamine, N-ethyldiethyleneamine, N-ethyldiisopropanolamine, amino ethylethanolamine, diethanolamine, and the like.

The aqueous polyurethane according to the present invention is emulsified and dispersed by gradually adding water to the thus obtained reactant liquid containing the aqueous polyurethane so as to gradually increase the degree of white turbidity. Then, the solvent used for dissolving the polyurethane prepolymer is removed by combinationally performing a heating procedure and a decompression procedure to obtain an aqueous polyurethane fluid dispersion containing 10 to 60% by weight of the aqueous polyurethane according to the present invention as a solid content.

EXAMPLES

The present invention will be explained in detail below using Examples. However, the present invention is not limited to these Examples. In the following Examples and Comparative Examples, the particle size distribution of each aqueous polyurethane fluid dispersion was measured using MICROTRAC UPA150 (manufactured by NIKKISO CO., LTD.) to determine a median size as a particle size of the aqueous polyurethane fluid dispersion.

Reference Example 1

Preparation of 2-bromoethylbenzene sulfonate 100.0 g (0.54 mol) of 2-bromoethylbenzene, 220.0 g of ethylene dichloride, 2.5 g (0.042 mol) of acetic acid were put in a 500 ml flask equipped with a stirrer, a thermometer, a tap funnel, and a reflux condenser. Then, 49.7 g (0.62 mol) of sulfuric acid anhydride were added dropwise for 90 minutes from the tap funnel while maintaining the temperature thereof at 40 to 45° C. After the end of the dropwise-addition, the reactant was aged at 45° C. for 60 minutes. After the end of the reaction, water was added dropwise to the reactant liquid, and then the reactant was separated into an ethylene dichloride phase and an aqueous phase. The aqueous phase was devolatilized using an evaporator at 70° C. for 30 minutes to obtain 194 g of 70% 2-bromoethyl sulfonate.

Then, 170.4 g (0.45 mol) of a 70% 2-bromoethyl sulfonate solution and water were put in a 500 ml flask equipped with a stirrer, a thermometer, a tap funnel, and a reflux condenser, and then 43.1 g (0.52 mol) of 48% NaOH were added dropwise for 60 minutes under ice-cooling (10° C.). After the end of the dropwise-addition, the reactant was further aged for 60 minutes. After the end of the reaction, the formed crystal was collected by filteration, and then dried at 80° C. to obtain 105.9 g of 2-bromoethylbenzene sodium sulfonate.

Production Example 1

Preparation of ethylenediamino-2,2'-bis(4-ethylbenzene sodium sulfonate) (which, hereinafter, may be abbreviated as BSS salt)

88.1 g (0.30 mol) of 2-bromoethylbenzene sodium sulfonate were dissolved in 300 g of water in a 500 ml flask equipped with a stirrer, a thermometer, and a reflux condenser (reactor), and then 9.0 g (0.15 mol) of ethylenediamine were added, followed by heating at 90° C. to react them for 5 hours. In accordance with the progression of the reaction, a HBr addition salt of ethylenediamino-2,2'-bis(ethylbenzene sodium sulfonate) was deposited. After the end of the reaction, the reactant was cooled to approximately room temperature, and then 29.0 g (0.30 mol) of a 48% NaOH aqueous solution were added dropwise for 10 minutes, followed by stirring for 30 minutes. Thus, a homogeneous reactant liquid was obtained by addition of NaOH. Then, the reactant liquid was collected from the reactor, and water was evaporated using an evaporator (at 50° C.), followed by adding 300 ml of methanol and stirring for a while. The mixture liquid was subjected to suction filtration to obtain crystal. The crystal was dried at 80° C. to obtain 58.1 g of ethylenediamino-2,2'-bis(ethylbenzene sodium sulfonate) represented by the following formula (6) (yield: 82.1%). The product was checked by $^1$H-NMR. The obtained crystal was dissolved in water to obtain a 50% by weight aqueous solution of BBS salt.

Production Example 3

Preparation of N-(2-aminoethyl)-2-aminoethane sulfonate (which, hereinafter, may be abbreviated as AAS salt)

9 g of ethylenediamine and 8.1 g of sodium isethionate were put in a stainless-steel pressure-resistant container, and heated at 190° C. for 7 hours. After the reactant was cooled to room temperature, 40 g of acetone were added, and then insoluble ingredients were filtered and dried to obtain a light yellow powder. As a result of NMR analysis of the powder in heavy water, peaks indicating N-(2-aminoethyl)-2-aminoethane sulfonate as the main ingredient were observed (2.5-2.7 ppm, 4H, m, HN—CH$_2$CH$_2$—NH, 2.8-3.2 ppm, 4H, m, N—CH$_2$CH$_2$—SO$_3$Na). As a result of comparison with the NMR peak and intensity of unreacted sodium isethionate, the content of AAS salt was 90%. The obtained light yellow powder was dissolved in water to obtain a 45% by weight aqueous solution of AAS salt.

Production Example 4

Preparation of hexamethylenediamino-2,2'-bis(4-ethylbenzene sodium sulfonate)

67.6 g of hexamethylenediamino-2,2'-bis(4-ethylbenzene sodium sulfonate) were obtained in the same way as that of

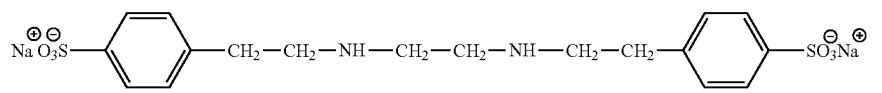

(6)

Production Example 1, except that 17.4 g (0.15 mol) of hexamethylenediamine were used instead of ethylenediamine (yield: 85.4%).

Production Example 2

Preparation of 2-(2'-aminoethyl)-(4-aminoethyl)benzene sodium sulfonate (which, hereinafter, may be abbreviated as MSS salt)

Reaction was performed in the same way as that of Example 1, except that 36.0 g (0.60 mol) of ethylenediamine were used. Unlike Example 1, no HBr addition salt was deposited. After the end of the reaction, 29.0 g (0.30 mol) of a 48% NaOH aqueous solution were added and stirred, and then water was evaporated. Then, 400 ml of a mixture liquid of methanol and ethanol (volume ratio of methanol/ethanol: 1/1) were added and stirred. The mixture liquid was subjected to suction filtration to separate crystal. The crystal was dried at 80° C. to obtain 40.7 g of 2-(2'-aminoethyl)-aminoethylbenzene sodium sulfonate represented by the following formula (7) (yield: 51.0%). The product was checked by $^1$H-NMR. The obtained crystal was dissolved in water to obtain a 45% by weight aqueous solution of MSS salt.

Production Example 5

Preparation of Compound Represented by the Following Formula (8)

88.1 g (0.30 mol) of 2-bromoethylbenzene sodium sulfonate were dissolved in 300 g of water in a 500 ml flask equipped with a stirrer, a thermometer, and a reflux condenser, followed by adding 10.3 g (0.10 mol) of diethylene triamine and heating at 90° C. to react for 5 hours. In accordance with the progression of the reaction, a HBr addition salt (3 mol) of a compound represented by the following formula (8) was deposited. After the reaction, the reactant was cooled to approximately room temperature, and 29.0 g (0.30 mol) of 48% NaOH aqueous solution were added dropwise for 10 minutes and stirred for 30 minutes. Thus, a homogeneous reactant liquid was obtained by addition of NaOH. Then, water was removed from the reactant liquid using an evaporator (at 50° C.), and 300 ml of methanol were added and stirred for 10 minutes. The mixture liquid was subjected to suction filtration to separate crystal. The crystal was dried at 80° C. to obtain 62.5 g of the compound represented by the formula (8) (yield: 86.7%). The product was checked by $^1$H-NMR.

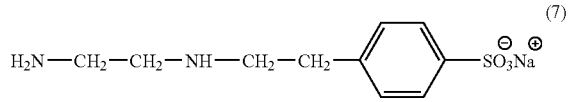 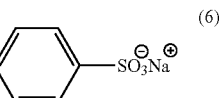

(7)

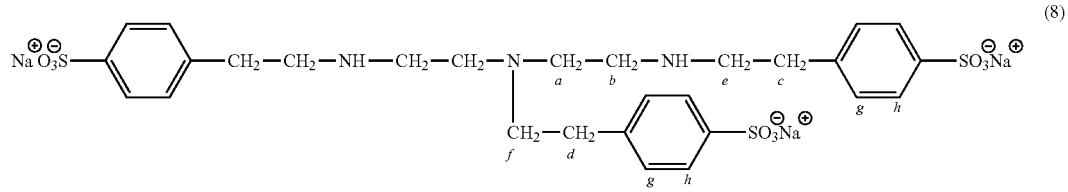

(8)

Peak position and attribution of $^1$H-NMR (formula 8)
a-f 2.65-2.85 ppm (20H)
g 7.28-7.38 ppm (6H)
h 7.64-7.75 ppm (6H)

Example 1

40.9 g of butylene glycol-adipic acid-based polyester (NIPPORAN 4010 manufactured by Nippon Polyurethane Industry Co., Ltd., with a molecular weight of 2000 and an OH value of 55 mg-KOH/g) were put in a 500 ml three-necked flask equipped with a stirring blade and subjected to vacuum dehydration at 120° C. for 30 minutes. Then, the temperature was lowered to 80° C., and 2.9 g of hexamethylene diisocyanate and 1.9 g of isophorone diisocyanate were added in the flask to start the reaction in a nitrogen gas stream. After 4 hours, when the residual amount of isocyanate was 1.1% by weight, the temperature was lowered to 50° C. to stop the reaction, and then 100 g of acetone were added to obtain a prepolymer solution. 2.8 g of 50% by weight aqueous solution of BSS salt obtained in Production Example 1 (0.066 mmol/g with respect to prepolymer, 0.132 mmol/g as sulfonate) and 0.2 g of ethylenediamine were added to the obtained prepolymer solution, and reacted for 20 minutes. Then, 65 g of ion-exchanged water were gradually added while stirring to emulsify and disperse the produced polyurethane. The obtained emulsified fluid dispersion was subjected to evaporation using an evaporator to remove remaining acetone. After acetone was evaporated, the emulsified fluid dispersion was a stable fluid dispersion having a solid content of 45% by weight and a median particle size of 1.4 μm. Results are shown in Table 1.

TABLE 1

| | Unit | Example 1 | Example 2 | Comparative Example 1 | Comparative Example 2 |
|---|---|---|---|---|---|
| Raw materials: | | | | | |
| NIPPORAN 4010 | g | 40.9 | 40.9 | 40.9 | 40.9 |
| HDI | g | 2.9 | 2.9 | 2.9 | 2.9 |
| IPDI | g | 1.9 | 1.9 | 1.9 | 1.9 |
| BSS salt | mmol/g | 0.066 | | | |
| MSS salt | mmol/g | | 0.132 | | |
| AAS salt | mmol/g | | | 0.066 | 0.132 |
| Property values: | | | | | |
| Hydrophilic group concentration | mmol/g | 0.132 | 0.132 | 0.066 | 0.132 |
| Particle size | μm | 1.4 | 1.9 | phase separation | 8.1[1] |

[1] After leaving still for a day, phase separation occurred due to particle precipitation.

Example 2

An emulsified polyurethane fluid dispersion was obtained in the same way as that of Example 1, except that 3.6 g of 45% MSS salt obtained in Production Example 2 (0.132 mmol/g with respect to prepolymer, 0.132 mmol/g as sulfonate) were used instead of the 50% by weight aqueous solution of BSS salt. The obtained emulsified fluid dispersion was a stable fluid dispersion having a solid content of 43% by weight and a median particle size of 1.9 μm. Results are shown in Table 1.

Comparative Example 1

The same procedures were performed as those of Example 1, except that 1.5 g of 45% AAS salt obtained in Production Example 3 (0.066 mmol/g with respect to prepolymer, 0.066 mmol/g as sulfonate) were used instead of the 50% by weight aqueous solution of BSS salt. Although the fluid dispersion obtained by adding ion-exchanged water was wholly clouded, phase separation immediately occurred due to particle-coarsening, and no stable emulsified fluid dispersion could be obtained. Results are shown in Table 1.

Comparative Example 2

An emulsified polyurethane fluid dispersion was obtained in the same way as that of Example 1, except that 2.9 g of 45% ASS salt obtained in Production Example 3 (0.132 mmol/g with respect to prepolymer, 0.132 mmol/g as sulfonate) were used instead of the 50% by weight aqueous solution of BSS salt. The obtained emulsified fluid dispersion had a solid content of 44% by weight and a median particle size of 8.1 μm. After the fluid dispersion was left still for one day, particle-precipitation occurred, and the fluid dispersion was unstable. Results are shown in Table 1.

As is apparent from the results, although the aqueous polyurethane having the hydrophilic group represented by the general formula (1) according to the present invention can provide a stable aqueous polyurethane fluid dispersion having a small particle size even at a low hydrophilic group concentration, no stable aqueous polyurethane fluid dispersion having a small particle size could be provided in the absence of the hydrophilic group represented by the general formula (1).

INDUSTRIAL APPLICABILITY

The aqueous polyurethane according to the present invention can provide a stable aqueous polyurethane fluid dispersion having a small particle size even if the concentration of hydrophilic group is low, and therefore the aqueous polyurethane is industrially extremely useful.

The invention claimed is:
1. An aqueous polyurethane obtained by reacting a sulfonate comprising a hydrophilic group represented by the following general formula (1):

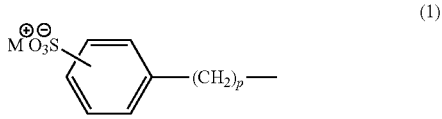

(1)

(wherein M represents an alkali metal atom or an ammonium, and p represents an integer of 2 to 20) and an amino group with a polyurethane prepolymer comprising an isocyanate group at an end thereof, wherein the hydrophilic group bonds with a urea bond moiety of the polyurethane, and an isocyanate value in which % by weight of NCO with respect to 1 g of the prepolymer is within a range of 0.05% to 10%.

2. The aqueous polyurethane according to claim 1, wherein the sulfonate is a sulfonate-containing amino compound represented by the following general formula (2):

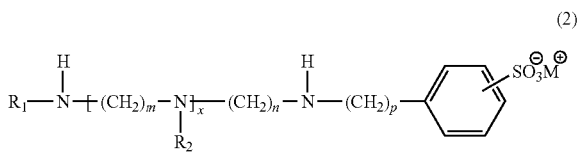

(2)

(wherein $R_1$ represents a hydrogen atom or the hydrophilic group;

$R_2$ represents a hydrogen atom, an alkyl group having 1 to 4 carbon atoms, or the hydrophilic group, M and p each represents the same as defined in claim 1, m and n each independently represents an integer of 1 to 20, and x represents an integer of 0 to 3).

3. The aqueous polyurethane according to claim 1, wherein p in the general formula (1) represents 2.

4. The aqueous polyurethane according to claim 3, wherein the sulfonate is a sulfonate-containing amino compound represented by the following general formula (4):

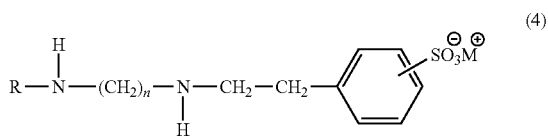

(4)

(wherein R represents a hydrogen atom, an alkyl group having 1 to 4 carbon atoms, or a group represented by the general formula (3), M represents an alkali metal atom or an ammonium, and n represents an integer of 1 to 20).

5. The aqueous polyurethane according to claim 1, wherein the polyurethane prepolymer is a polyurethane prepolymer obtained by reacting a polyol ingredient and a diisocyanate ingredient.

6. A method for producing the aqueous polyurethane of claim 1, comprising:

reacting a sulfonate comprising a hydrophilic group represented by the following general formula (1):

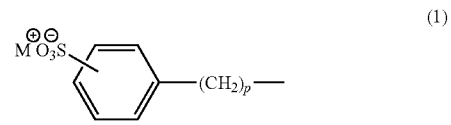

(1)

(wherein M represents an alkali metal atom or an ammonium, and p represents an integer of 2 to 20) and an amino group with a polyurethane prepolymer comprising an isocyanate group at an end thereof in a presence of water, wherein an isocyanate value in which % by weight of NCO with respect to 1 g of the prepolymer is within a range of 0.05% to 10%.

7. The method for producing the aqueous polyurethane according to claim 6, wherein the sulfonate is a sulfonate-containing amino compound represented by the following general formula (2):

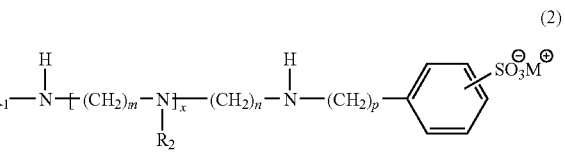

(2)

(wherein $R_1$ represents a hydrogen atom or the hydrophilic group, $R_2$ represents a hydrogen atom, an alkyl group having 1 to 4 carbon atoms, or the hydrophilic group, M represents an alkali metal atom or an ammonium and p represents an integer of 2 to 20, m and n each independently represents an integer of 1 to 20, and x represents an integer of 0 to 3).

8. The method for producing the aqueous polyurethane according to claim 6, wherein p in the general formula (1) represents 2.

9. The method for producing the aqueous polyurethane according to claim 8, wherein the sulfonate is a sulfonate-containing amino compound represented by the following general formula (4):

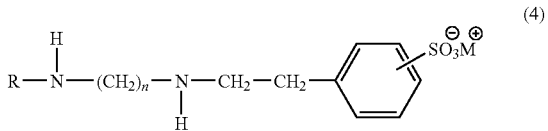

(4)

(wherein R represents a hydrogen atom, an alkyl group having 1 to 4 carbon atoms, or the hydrophilic group, M represents an alkali metal atom or an ammonium, and n represents an integer of 1 to 20).

10. The method for producing the aqueous polyurethane according to claim 6, wherein the polyurethane prepolymer is a polyurethane prepolymer obtained by reacting a polyol ingredient and a diisocyanate ingredient.

11. An aqueous polyurethane fluid dispersion comprising the aqueous polyurethane of claim 1.

12. A method for producing the aqueous polyurethane fluid dispersion of claim 11, comprising:

reacting a sulfonate comprising a hydrophilic group represented by the following general formula (1):

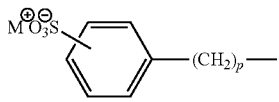

(wherein M represents an alkali metal atom or an ammonium, and p represents an integer of 2 to 20)

and an amino group with a polyurethane prepolymer comprising an isocyanate group at an end thereof to obtain a reactant liquid;

adding water to the reactant liquid; and emulsifying and dispersing an aqueous polyurethane, wherein an isocyanate value in which % by weight of NCO with respect to 1 g of the prepolymer is within a range of 0.05% to 10%.

13. The method for producing the aqueous polyurethane fluid dispersion according to claim 12, wherein the sulfonate is a sulfonate-containing amino compound represented by the following general formula (2):

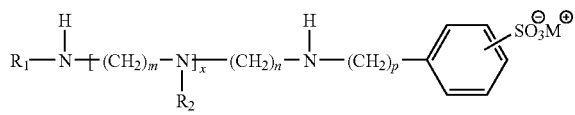

(wherein $R_1$ represents a hydrogen atom or the hydrophilic group, $R_2$ represents a hydrogen atom, an alkyl group having 1 to 4 carbon atoms, or the hydrophilic group, M represents an alkali metal atom or an ammonium and p represents an integer of 2 to 20, m and n each independently represents an integer of 1 to 20, and x represents an integer of 0 to 3).

14. The method for producing the aqueous polyurethane fluid dispersion according to claim 13, wherein p in the general formula (1) represents 2, and the sulfonate is a sulfonate-containing amino compound represented by the following general formula (4):

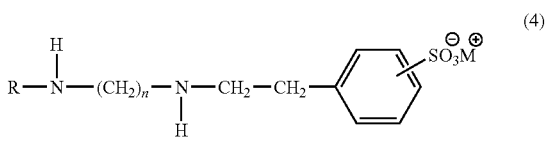

(wherein R represents a hydrogen atom, an alkyl group having 1 to 4 carbon atoms, or the hydrophilic group, M represents an alkali metal atom or an ammonium and n represents an integer of 1 to 20.

15. The method for producing the aqueous polyurethane fluid dispersion according to claim 12, wherein the polyurethane prepolymer is a polyurethane prepolymer obtained by reacting a polyol ingredient and a diisocyanate ingredient.

* * * * *